(12) United States Patent
Chen et al.

(10) Patent No.: US 10,538,039 B2
(45) Date of Patent: Jan. 21, 2020

(54) ROLL OF STRUCTURAL MATERIAL, IT'S METHOD OF MAKING AND A METHOD OF MAKING A WIND TURBINE BLADE

(71) Applicant: Vestas Wind Systems A/S, Aarhus N. (DK)

(72) Inventors: Zhen-Zhe Chen, Ringkøbing (DK); Morten Taulbjerg, Holstebro (DK)

(73) Assignee: Vestas Wind Systems A/S, Aarhus N. (DK)

( * ) Notice: Subject to any disclaimer, the term of this patent is extended or adjusted under 35 U.S.C. 154(b) by 352 days.

(21) Appl. No.: 15/325,844

(22) PCT Filed: Jul. 14, 2015

(86) PCT No.: PCT/DK2015/050221
§ 371 (c)(1),
(2) Date: Jan. 12, 2017

(87) PCT Pub. No.: WO2016/008499
PCT Pub. Date: Jan. 21, 2016

(65) Prior Publication Data
US 2017/0165923 A1 Jun. 15, 2017

(30) Foreign Application Priority Data
Jul. 16, 2014 (GB) .................................. 1412651.0

(51) Int. Cl.
*B29C 70/36* (2006.01)
*B65H 75/20* (2006.01)
(Continued)

(52) U.S. Cl.
CPC ................ *B29C 70/36* (2013.01); *B32B 5/06* (2013.01); *B32B 37/0076* (2013.01);
(Continued)

(58) Field of Classification Search
CPC . B29C 70/36; B29C 70/54; B29C 70/30–388; B32B 5/06; B32B 37/18;
(Continued)

(56) References Cited

U.S. PATENT DOCUMENTS 2,350,369 A * 6/1944 Sampair ................ A61F 15/002
206/411
2,457,786 A * 12/1948 Slayter ................. B65H 75/245
242/472.8
(Continued)

FOREIGN PATENT DOCUMENTS

EP 2481557 A2 8/2012
EP 2684829 A1 1/2014
(Continued)

OTHER PUBLICATIONS

European Patent Office, International Search Report and Written Opinion in PCT Application Serial No. PCT/DK2015/050221, dated Sep. 23, 2015.
(Continued)

*Primary Examiner* — Jeffrey M Wollschlager
(74) *Attorney, Agent, or Firm* — Wood Herron & Evans LLP

(57) ABSTRACT

A roll (16) of structural material for use in the manufacture of large composite structures such as wind turbine blades is described. The roll (16) comprises an elongate stack of structural layers (10) fastened together and wrapped around a reel (14). The reel (14) comprises a plurality of mutually spaced supports (50) about which the stack is folded into a rolled stack. Sections of the rolled stack between the supports are substantially unsupported by the reel and are held in a slack state in order to prevent wrinkles from forming in the rolled stack.

20 Claims, 5 Drawing Sheets

(51) Int. Cl.
 *B32B 5/06* (2006.01)
 *B32B 37/00* (2006.01)
 *B32B 37/18* (2006.01)
 *B32B 38/18* (2006.01)
 *B65H 75/14* (2006.01)
 *B29K 309/08* (2006.01)
 *B29L 31/08* (2006.01)

(52) U.S. Cl.
 CPC ............. *B32B 37/18* (2013.01); *B32B 38/18* (2013.01); *B65H 75/14* (2013.01); *B65H 75/20* (2013.01); *B29K 2309/08* (2013.01); *B29K 2313/00* (2013.01); *B29L 2031/085* (2013.01); *B32B 2262/101* (2013.01); *B32B 2315/085* (2013.01); *B32B 2603/00* (2013.01)

(58) Field of Classification Search
 CPC ............... B32B 38/18; B32B 37/0076; B32B 2315/085; B32B 2603/00; B32B 2262/101; B65H 75/14; B65H 75/20; B29L 2031/085; B29K 2313/00; B29K 2309/08
 See application file for complete search history.

(56) References Cited

U.S. PATENT DOCUMENTS

| | | | | |
|---|---|---|---|---|
| 3,540,669 | A * | 11/1970 | Schmidt | B29C 53/32 |
| | | | | 242/417.3 |
| 4,657,202 | A * | 4/1987 | Sauber | B65H 75/18 |
| | | | | 242/577.1 |
| 5,071,082 | A * | 12/1991 | Lefevre | B65H 75/18 |
| | | | | 242/118.4 |
| 5,915,062 | A | 6/1999 | Jackson et al. | |
| 9,212,021 | B2 * | 12/2015 | Rhodes | B65H 75/10 |
| 9,346,652 | B2 * | 5/2016 | Noumi | B65H 75/04 |
| 2014/0001306 | A1 * | 1/2014 | Noumi | B65H 75/10 |
| | | | | 242/613.2 |

FOREIGN PATENT DOCUMENTS

WO 2012042261 A1 4/2012
WO 2013060336 A1 5/2013

OTHER PUBLICATIONS

Intellectual Property Office, Search and Examination Report in GB1412651.0, dated Jan. 15, 2015.

* cited by examiner

ROLL OF STRUCTURAL MATERIAL, IT'S METHOD OF MAKING AND A METHOD OF MAKING A WIND TURBINE BLADE

TECHNICAL FIELD

The present invention relates to the manufacture of large composite structures such as wind turbine blades using stacks of pre-assembled materials.

BACKGROUND

Wind turbine blades and many other large composite structures such as composite aircraft wings, fuselages and boat hulls, are typically formed in large female moulds using composite fabrication techniques such as vacuum assisted resin transfer moulding (VARTM). The process involves arranging one or more layers of dry glass-fibre fabric in the mould together with other structural components to form a 'lay-up'.

The lay-up is then covered by vacuum film and sealed against the mould to create a sealed region enclosing the lay-up. Air is removed from the sealed region to create an effective vacuum and resin is admitted into the sealed region. The resin infuses through and between the glass-fibre layers and other structural components in the sealed region. Heat is then applied to the resin-infused lay-up to cure, i.e. harden, the resin. The cured resin serves to integrate the various layers together in the composite structure.

The moulds for modern wind turbine blades are very large, in some cases in excess of 80 metres in length, and several metres in width. Such large moulds are naturally very expensive and occupy a significant amount of space within a blade manufacturing facility. Accordingly, a typical blade manufacturing facility may only have a single mould, or just a few moulds. In order to optimise the efficiency of the manufacturing process and increase the rate of blade production, it is desirable to minimise the 'in-mould time' associated with the process, i.e. the amount of time that a mould is monopolised in order to make a blade.

In order to minimise the in-mould time of blade production, some operations are performed offline, in advance of the mould being used. For example, multiple glass-fibre layers or 'plies' may be stacked together on a flat surface such as a table or the factory floor to form a stack (also referred to as a 'kit' or 'pack'). The stacked layers are held together by stitching or other suitable means such as adhesive tape. The pre-assembled stack is then transferred to the mould and arranged in the mould at the appropriate time in the manufacturing process. By forming the stack offline, multiple plies can be arranged in the mould in a single operation, whereas previously each ply would have needed to be arranged in the mould individually. The use of such pre-assembled stacks can therefore significantly reduce the in-mould time required to make a blade.

In a typical wind turbine blade, there are different numbers of stacked glass-fibre layers in different regions of the blade, according to the structural requirements of those regions. For example, the root of the blade is required to be very thick and hence ten or more glass-fibre layers may be stacked in the root region of the mould. In contrast, the tip of the blade is very thin and may only require a single glass-fibre layer. Other discrete regions of the blade may require extra layers of glass-fibre fabric where local reinforcement is required. These factors are all taken into consideration when preparing the stacks, so a stack may vary in thickness across its width and along its length in some cases.

Presently, the stacks are stored in a generally flat state, and lifted and placed in the blade mould when required. However, the flat stacks are difficult to store and take up significant space. They are also difficult to handle and several operators may be required to support the periphery of the stack as it is lifted and placed in the mould. As it is desirable to produce wind turbine blades of increasing size (in order to capture increasing energy from the wind), it is important that manufacturing processes can be scaled up. The present method of storing and placing stacks in the mould is not easily scalable as handling and storage problems are exacerbated with increasing stack sizes. Therefore, the present method is only suitable for relatively small stacks, and hence very many stacks must be assembled and arranged individually in the mould to make a large wind turbine blade.

Referring to FIGS. 1a-1c, in seeking to develop a scalable solution that addresses the above problems, and which further reduces the in-mould time of blade production, the inventors of the present invention conducted non-public trials in which a plurality of glass-fibre strips 12a, 12b were stacked one on top of another to form a stack 10. The stacked strips were stitched together along stitch lines 13 at regular intervals along their lengths (FIG. 1a). The stack 10 was then rolled around a cylindrical drum 14 of circular cross section to form a roll 16 (FIG. 1b). For ease of illustration, the stack 10 shown in FIGS. 1a-1c consists of two glass-fibre layers 12a and 12b, which are stitched together, but in reality the stack may comprise several layers stitched together. Also, whilst the roll 16 shown in FIG. 1b comprises only a single turn of the stack 10 around the drum 14, in practice the stack 10 is turned several times around the drum 14.

The roll 16 addressed the storage problems associated with large flat stacks as the roll 16 takes up less space in the factory than flat (i.e. non-rolled) stacks. Handling and placement is also facilitated in comparison to the prior art method as the roll 16 is simply unrolled in the mould when required, which can be performed by relatively few operators.

However, it was noted that the stacked layers 10 had a tendency to develop wrinkles when formed into a roll. Referring to FIG. 1c, which is a schematic drawing showing the stacked strips 12a, 12b being rolled around part of the drum 14, the cause of the wrinkles 15 was found to be attributable to the outer layers 12b of the stack 10 having a larger radius of curvature, and hence a longer circumferential length, than the inner layers 12a of the stack 10 when rolled around the circular drum 14. This causes different levels of tension in the various layers 12a, 12b of the stack 10 and causes some of the layers to move or stretch more than other layers. As relative movement between the layers 12a, 12b is constrained by the stitches at the stitch lines 13, one or more of the layers 12a, 12b inevitably develops wrinkles 15 between the stitch lines 13 due to the circumferential path difference between the layers 12a, 12b. In this example, the outer layer 12b of the stack 10 has a longer circumferential path around the drum 14 than the inner layer 12a and hence the inner layer 12a tends to develop wrinkles 15 between the stitch lines 13.

The problem of wrinkles developing was found to be particularly acute for stacks consisting of several layers, such as the stacks required for relatively thick parts of the wind turbine blades, where eight or more glass-fibre layers are stitched together to form the stack. It is desirable to avoid wrinkles in the fibre layers as wrinkles tend to compromise the structural integrity of the finished component.

Accordingly, it is an object of the present invention to provide a scalable solution that avoids or at least minimises the formation of wrinkles in the fibrous layers.

SUMMARY OF THE INVENTION

According to a first aspect of the invention, there is provided a roll of structural material comprising: an elongate stack comprising a plurality of layers of structural material stacked one on top of another and held together by fastening means; and a reel having a plurality of mutually spaced supports about which the stack is folded to form a rolled stack; wherein the reel is configured such that the rolled stack is supported by the supports and sections of the rolled stack between the supports are substantially unsupported by the reel and are thereby in a slack state.

Prior to the stack being formed into a roll, the stack is preferably in the form of an elongate strip.

As the rolled stack is held in a slack state between supports, the layers of the stack are able to move slightly relative to one another in the roll. For example, the layers may slide relative to one another or they may 'relax' or sag under their own weight. This relative movement of the layers allows the rolled stack to compensate for any path differences between the layers of the stack which are introduced when the stack is folded around the supports. Accordingly, by holding sections of the rolled stack in a slack state on the reel, wrinkles are substantially prevented from forming as the stack is rolled.

The present invention provides a scalable solution and allows very long and/or thick stacks to be formed into a roll without wrinkles being introduced. In particularly preferred examples, a stack having a length in excess of 40 metres can be formed into a roll without appreciable wrinkling. Such stacks may comprise several layers held together by stitches or other suitable means. For example, the stacks may comprise up to eight or more glass-fibre plies.

Preferably the stack comprises a plurality of glass-fibre layers kitted together. Other material layers may also be included in the stack and rolled around the reel without appreciable wrinkling. Accordingly, many layers of a wind turbine blade may be kitted together offline, formed into a roll to facilitate storage and handling, and later unrolled relatively quickly and easily into a wind turbine blade mould by relatively few operators. The unrolled stack is advantageously substantially devoid of wrinkles and hence relatively little adjustment of the unrolled stack is required. The present invention therefore significantly speeds up the lay-up process in the manufacture of utility-scale wind turbine blades.

In preferred examples of the invention, the reel comprises an inner region defined between the supports into which the unsupported sections of the rolled stack sag. For example the reel may be substantially hollow, with the supports positioned near the outer periphery of the reel.

The layers may be fastened together along a plurality of fastening lines extending in a widthwise direction of the stack. The layers are preferably fastened together by means of stitches, i.e. stitched together, but alternatively the layers may be held together by any other suitable means, for example by double-sided adhesive tape or other adhesives. The fastening lines, e.g. the stitch lines, are preferably spaced at intervals in a longitudinal direction of the stack.

In preferred embodiments, the supports of the reel are mutually spaced apart by a distance greater than the intervals between fastening lines. Accordingly, each section of the stack between adjacent fastening lines is supported by, at most, a single support and thus has an opportunity to relax when rolled around the reel.

The supports of the reel are preferably substantially elongate and extend transverse to a longitudinal direction of extension of the stack. Preferably the supports extend in a direction substantially parallel to a widthwise direction of the stack. The supports may be in the form of flat planks, tubes, rods, and may have any suitable cross-sectional shape, for example rectangular, square, circular etc. Circular-section supports (or supports having an otherwise curved cross-section) are particularly advantageous because stress concentrations are avoided when the stack is folded about the supports.

The reel may have any number of supports provided that there is space between the supports for the stack to relax. The supports may be arranged in any suitable configuration. In one example, there are two spaced-apart supports such that the reel is generally planar. In another embodiment there are three supports arranged in a triangle. In other embodiments the supports may be arranged as a square, pentagon, hexagon, circle etc.

The supports of the reel may be connected together by intermediate connecting members and/or the supports may be connected at their respective ends to end plates.

The end plates may be any suitable shape, but substantially circular end plates are advantageous as they facilitate rolling of the reel.

The stack is preferably configured to form part of a wind turbine blade shell. In this respect the various layers of the stack are pre-cut to the requisite size and shape for inclusion in the blade prior to or during the process of assembling the stack.

The invention also provides a method of making a roll of structural material. The method comprises: stacking a plurality of layers of structural material one on top of another to form a stack; fastening the layers together; providing a reel having a plurality of supports mutually spaced apart; and folding the stack around the supports to form a rolled stack, wherein the rolled stack is supported by the supports and sections of the rolled stack between the supports are substantially unsupported by the reel and are thereby in a slack state.

The reel preferably comprises an internal region defined between the supports, and the method preferably comprises allowing the unsupported sections of the rolled stack to sag into the internal region.

The method preferably involves fastening the layers together along a plurality of fastening lines extending in a widthwise direction of the stack. The fastening lines are preferably spaced at intervals in a longitudinal direction of the stack. Preferably the method involves stitching the layers together.

The method preferably comprises assembling the stack off-line, i.e. outside the wind turbine blade mould, and preferably in advance of the blade manufacturing process involving the mould. The method preferably comprises assembling the stack on a substantially flat surface, for example on a table or on the factory floor. Once the stack has been assembled, the method preferably comprises rolling the stack around the reel on the substantially flat surface.

The method preferably comprises configuring the stack to form part of a wind turbine blade shell.

The invention also provides a method of making a wind turbine blade, the method comprising: providing a blade mould; providing a roll of structural material as described above, the structural material being configured to form part of a wind turbine blade shell; and unrolling the structural material into the mould. The method preferably comprises making the roll outside the blade mould according to the above method, transferring the roll to the blade mould and unrolling the structural material in the blade mould.

For the avoidance of doubt, optional features described above or claimed in relation to the invention when expressed in terms of an apparatus are equally applicable to the invention when expressed in terms of a method and vice versa. Repetition of such features has been avoided where possible purely for reasons of conciseness.

BRIEF DESCRIPTION OF THE DRAWINGS

FIGS. 1a-1c have already been described above by way of background to the invention. In order that the invention may be more readily understood, examples of the invention will now be described with reference to the following figures, in which:

DETAILED DESCRIPTION

Figure 1A:
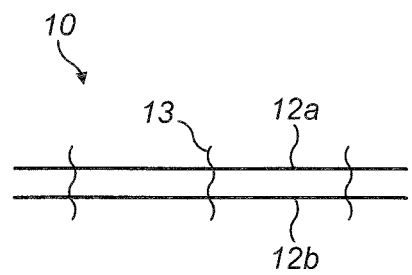
Figure 1B:
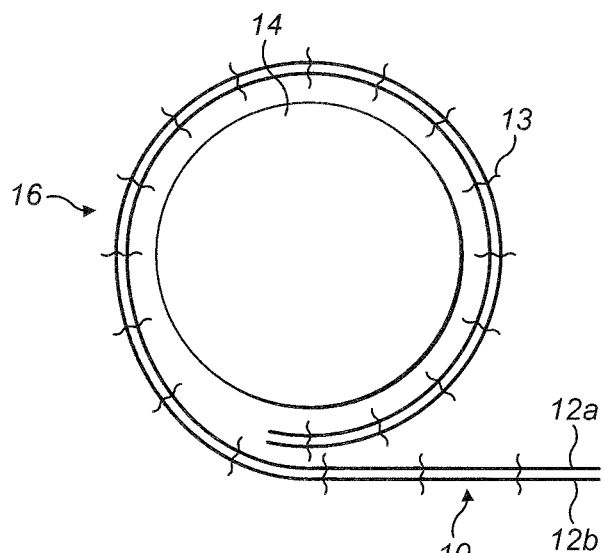
Figure 1C:
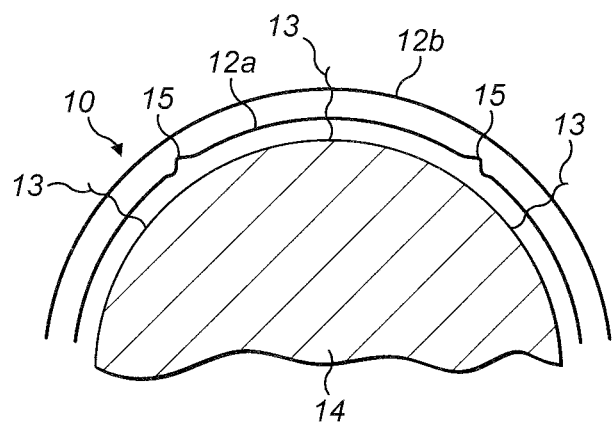
Figure 2A:
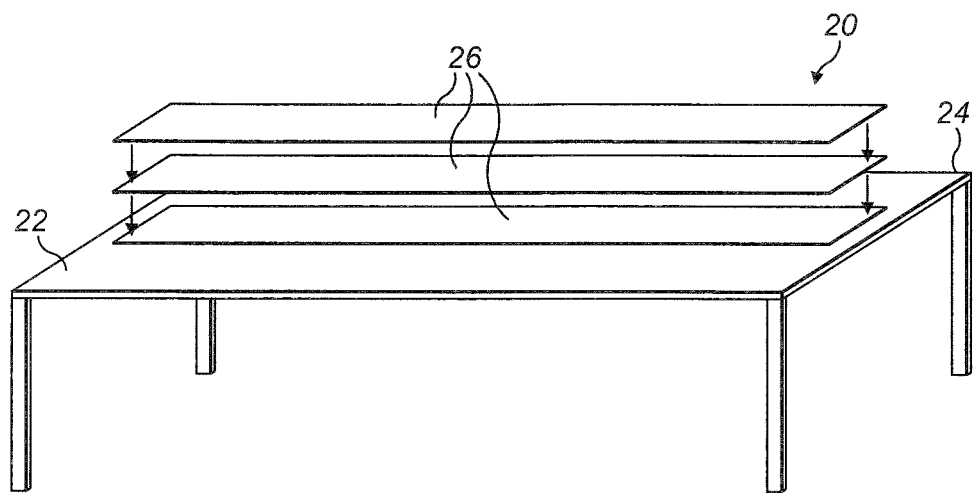
FIGS. 2a and 2b schematically illustrate a stack being assembled from a plurality of fibrous layers on a table.

Referring to FIG. 2a, this shows a stack 20 being assembled on a flat surface 22 of a table 24. The stack 20 is to be used in the manufacture of a wind turbine blade, as will be described in further detail later. As mentioned by way of introduction, assembly of the stack offline, i.e. outside the blade mould, is advantageous because it speeds up the layup process and hence reduces the in-mould time of blade production.

In this example, the stack 20 comprises three layers or strips 26 of glass-fibre fabric material, which are placed one on top of the other, as indicated by the arrows. The glass-fibre fabric may be any suitable fabric, for example it may comprise unidirectional fibres or biaxial or triaxial woven fibres. The fabric layers 26 are each cut to the required shape and size according to the dimensions and structural requirements of the wind turbine blade. Whilst for ease of illustration the layers 26 shown in FIG. 2a all appear to be the same, in reality they may be the same or different from one another in terms of shape, size and material.

Figure 2B:
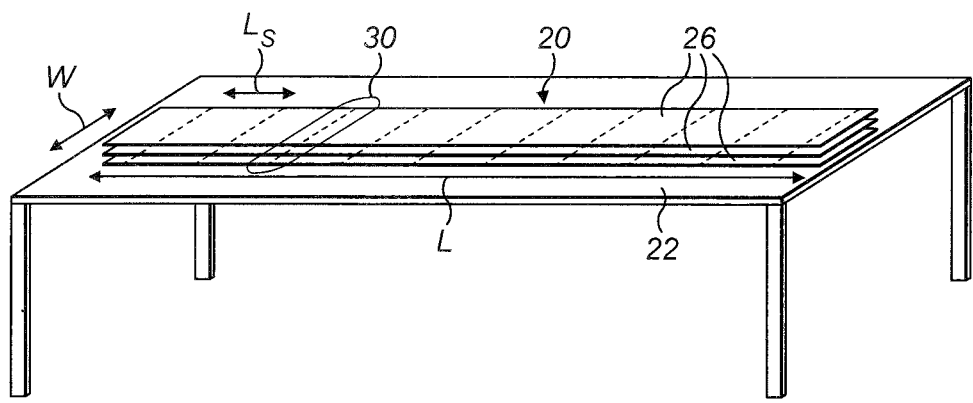

Referring to FIG. 2b, once the fabric layers 26 have been placed on top of one another on the table 24, they are fastened together by means of stitches 28. The stitches 28 serve to hold the layers 26 loosely together in the stack 20. Other means of fastening the layers 26 together may be used, for example adhesives, tape, clamps, welding etc. The stitches 28 run generally parallel to the width W of the stack 20, and form stitch lines 30 which are spaced at longitudinal intervals $L_s$ of approximately one metre along the length L of the stack 20.

The stack 20 is in the form of an elongate strip, and for ease of illustration, a short stack 20 is shown in FIGS. 2a and 2b, but in reality very long stacks are preferred as fewer stacks are then required to form a blade, thereby reducing the time required to assemble the blade materials in the mould. In a particularly successful trial, a stack comprising eight glass-fibre layers and having a length L of approximately 45 metres, and a width W of approximately 2.5 metres was assembled. Accordingly, only a few stacks of this approximate size are required to make a wind turbine blade having a length in excess of 80 metres.

Once the stack 20 has been assembled on the flat surface 22, it is rolled or 'packed' around a reel 32 (FIG. 3a) to form a roll as described in further detail below with reference to FIGS. 3a and 3b. The roll facilitates storage and handling of the stack 20.

Figure 3A:
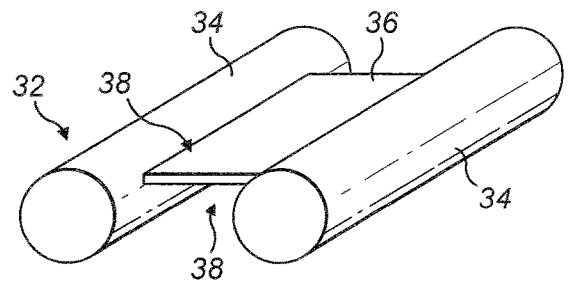
FIG. 3a is a schematic perspective view of a first example of a reel for winding the stack around.

FIG. 3a shows a first example of a reel 32 upon which the stack 20 is rolled to form a rolled stack. The reel 32 may also be referred to as a 'spool', 'bobbin' or 'drum'. The reel 32 in this example comprises a pair of tubular supports 34, each of circular cross section, which are mutually spaced apart. The tubular supports 34 extend parallel to one another and are joined together by an intermediate connecting frame 36. An inner region 38 of the reel 32 is defined between the supports 34 and the connecting frame 36, on both sides of the frame 36.

Figure 3B:
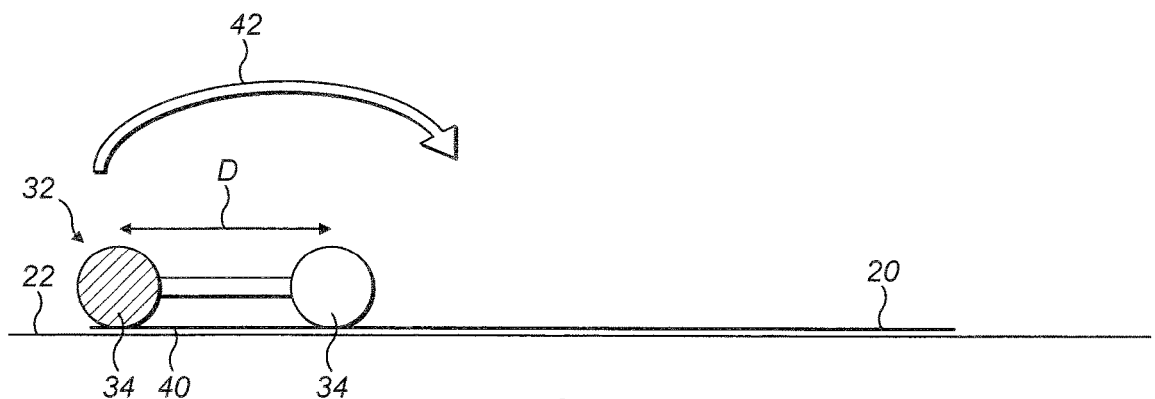
FIGS. 3b and 3c show the stack being wound around the reel to form a rolled stack.

Referring now to FIG. 3b, the rolling or packing process begins by placing the reel 32 on top of the stack 20 at a first end 40 of the stack 20. The reel 32 is arranged such that the tubular supports 34 extend substantially parallel to the width W of the stack 20, i.e. substantially perpendicular to the length L of the stack 20. One of the supports 34 has been shaded in FIGS. 3b and 3c for illustrative purposes. The first end 40 of the stack 20 is then attached to the reel 32 using tape or other suitable means of attachment. The reel 32 is then lifted and turned through 180 degrees on top of the stack 20, in the direction of extension of the stack 20. In this example, the stack 20 extends from left to right, i.e. the first end 40 of the stack 20 is located on the left-hand side of FIG. 3b. Accordingly, in this example the reel 32 is turned in a clockwise direction, as represented by the arrow 42 in FIG. 3b.

Figure 3C:
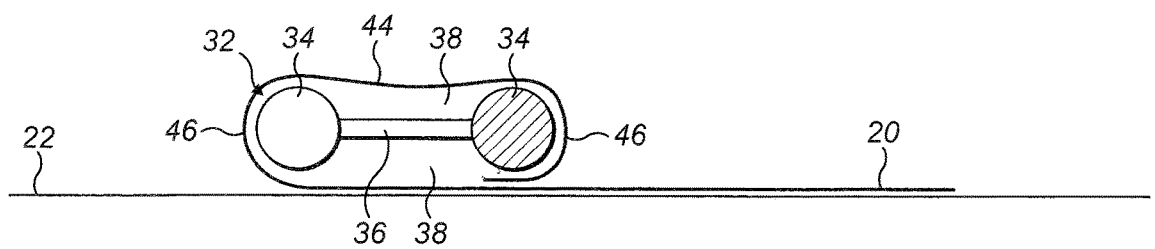

Referring now to FIG. 3c, turning the reel 32 with the stack 20 attached causes the stack 20 to fold around the tubular supports 34 at both ends of the reel 32. The reel 32 is then repeatedly turned clockwise, 180 degrees at a time, along the stack 20 until the entire length of the stack 20 has been rolled around the reel 32. Several turns are required to roll the entire stack 20 around the reel 32. In the case of the 45-metre long stack mentioned above, the rolled stack comprises approximately fifteen turns about the reel 32.

For convenience, the stack 20 is illustrated in FIGS. 3b and 3c as a single line, however it will be appreciated that the stack 20 consists of a plurality of layers 26 as described above with reference to FIGS. 2a and 2b. Therefore, as the reel 32 is turned, each of the layers 26 of the stack simultaneously folds around the supports 34. The circular cross-section of the supports 34 is advantageous because the stack 20 follows a continuous curvature as it folds around the supports 34 and hence stress concentrations are minimised.

As explained by way of introduction to the invention, as the stack 20 is folded around the supports 34, the outer layers of the stack 20 have further to travel than the inner layers, and hence a slight path difference is introduced between the respective layers 26 of the stack 20 when the stack 20 is folded. Expressed in other words, for any given turn or loop of the stack 20 about the reel 32, the radius of curvature of the outermost layers of the stack 20 about the supports 34 is greater than the radius of curvature of the innermost layers.

It is important that the layers 26 of the stack 20 remain correctly aligned with one another when they are folded around the reel 32 so that the various layers of the stack 20 are correctly positioned when the stack 20 is later unrolled into a wind turbine blade mould. The widthwise stitch lines 30 spaced at regular longitudinal intervals along the stack 20, which were described above with reference to FIG. 2*b*, ensure that the layers 26 remain generally aligned and prevent the layers 26 moving or sliding significantly with respect to one another as the stack 20 is rolled. However, the path difference between layers 26 as the layers 26 are folded has the potential to cause wrinkles in the stack 20 between the stitch lines 30 as the stack 20 is rolled. These wrinkles are particularly undesirable as they may ultimately compromise the structural integrity of the blade.

Referring still to FIG. 3*b*, as the stack 20 is rolled around the supports 34, the tubular supports 34 serve to support the stack 20 at both ends of the reel 32. However, sections 44 of the rolled stack 20 between the supports 34 remain substantially unsupported by the reel 32 and are allowed to relax, i.e. sag under their own weight, into the inner regions 38 of the reel 32 defined between the supports 34 and the connecting frame 36 as the reel 32 is turned. These sections 44 of the stack 20 are referred to herein as 'unsupported' sections 44, in contrast to the curved or folded sections 46 of the stack 20 that are supported by the supports 34, and which are referred to herein as 'supported' sections 46. Accordingly, the reel 32 is configured such that the stack 20 is held in a slack state between the supports 34.

The path difference between the various layers 26 of the stack 20 results in the various layers 26 having slightly different tensions as they are rolled. In general, for equivalent layers, the outer layers of the stack 20 (when rolled) will have a greater tension than the inner layers because they have a larger radius of curvature about the supports 34. Accordingly, in the unsupported sections 44 of the stack 20 the outer layers will relax or sag slightly less than the inner layers. The varying amounts of slack in the various layers 26 of the stack 20 compensates for any path differences between the layers 26, and hence substantially avoids the formation of wrinkles when the stack 20 is rolled. There is also a relatively low level of friction between the glass-fibre layers 26 comprising the stack 20. Accordingly, the layers 26 of the stack 20 can slide relative to each other as the unsupported sections 44 sag; this again allows the stack 20 to compensate for the path differences between layers 26 and thus prevents wrinkles from forming.

In this example, the distance D (FIG. 3*b*) between the supports 34 of the reel 32 is approximately two metres, and hence the unsupported sections 44 of the stack 20 are approximately two metres in length. This distance D is advantageously greater than the separation $L_s$ (FIG. 2*b*) between adjacent stitch lines 30, which in this example is approximately one metre. Ensuring that the mutual separation D between supports 34 is greater than the stitch line intervals $L_s$ ensures that the sections of the stack 20 between stitch lines 30 have an opportunity to relax when rolled around the reel 32.

Figure 4:
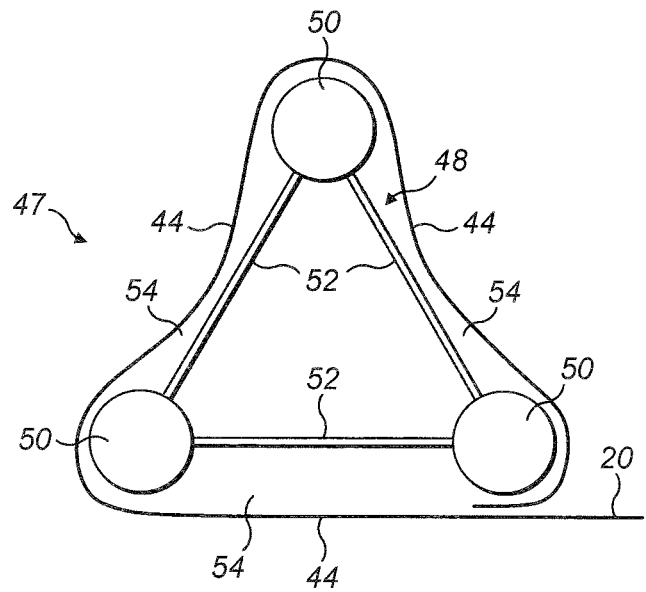
FIG. 4 shows a roll in which the stack is wound around a triangular reel.

Referring now to FIG. 4, this shows a roll 47 according to an alternative embodiment of the invention. In this example, the reel 48 is generally triangular in cross section. More specifically, the reel 48 comprises three supports 50, each being in the form of a tube of circular cross section similar to the previous embodiment. The tubes 50 extend parallel to one another and are mutually spaced apart in the form of a triangle, with each tube being located at a corner of the triangle, when viewed in cross section as shown in FIG. 4. The supports 50 are connected together by connecting members 52 provided between adjacent supports 50. The connecting members 52 are arranged generally in the form of a triangle when viewed in cross section. An inner region 54 of the reel 48 is defined on each side of the reel 48 between adjacent supports 52 and the associated connecting member 52.

The stack 20 is rolled around the triangular reel 48 in this example in a similar manner to that already described above for the first embodiment. However, in this case the triangular reel 48 is turned in 120-degree stages. Also, in this embodiment, for each turn of the stack 20 around the reel 48, there are three unsupported sections 44 of stack 20 between adjacent supports 50, which provides increased opportunities for the layers 26 of the stack 20 to relax to avoid wrinkle formation. The unsupported sections 44 are held in a slack state between supports 50 and sag into the inner regions 54 of the reel 48 as the reel 48 is turned. As the stack 20 is folded about three supports 50, the radius of curvature of the stack 20 around each support 50 is slightly less in this example than in the previous example, where the reel 32 had two supports 34. This gentler curving of the stack 20 means that the path difference between the inner and outer layers 26 of the stack 20 around the supports 50 is less pronounced, thus further reducing the opportunity for wrinkles to form.

Figure 5:
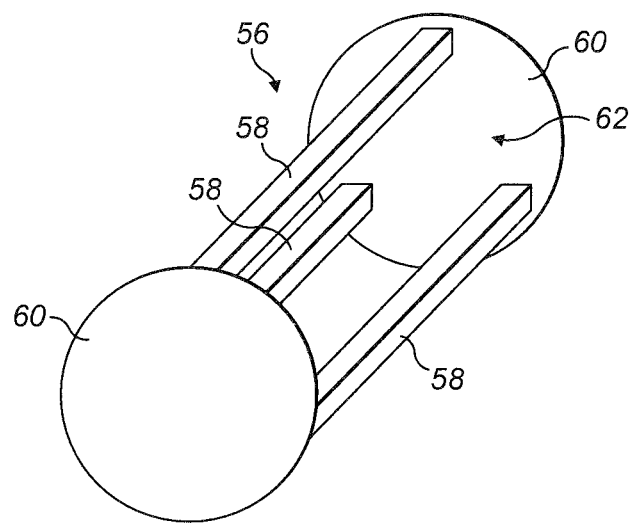
FIG. 5 shows a further example of a reel for winding the stack around.

FIG. 5 shows a further example of a reel 56 upon which the stack may be rolled. In common with the previous example, the reel 56 comprises three supports 58 arranged generally in a triangular formation in cross-section. In this example, the supports 58 are elongate bars of rectangular cross-section, but they could equally be circular section tubes as in the previous examples or flat planks or indeed they may have any other suitable shape. Whereas the supports 34, 50 in the previous examples are connected by intermediate connecting members 36, 52, in this example the supports 58 are connected to circular end plates 60 at each end of the supports 58. The supports 58 extend perpendicular to the plane of the end plates 60. An inner region 62 of the reel 56 is defined between the supports 58 and the end plates 60. The circular end plates 60 allow the reel 56 to be rolled more easily along the length of the stack. As the stack is rolled around the reel 56, unsupported sections of the stack sag into the inner region 62 defined inside the reel 56. A particular advantage of this arrangement is that the absence of connecting members between the supports 58 provides more room inside the reel 56 for the layers 26 of the stack to relax.

Once the stack has been formed into a roll, the roll can then be stored for later use. The roll takes up significantly less space than a flat stack, and several rolls can be packed closely together or stacked if required. The roll can be stored or stacked vertically or horizontally, i.e. with the axis about which the stack is rolled being vertical or horizontal. The end plates 60 described above are particularly convenient when storing the rolls, for example they may be used to support other rolls if the rolls are stacked vertically, or they may serve to support the rolled stack off the ground when the roll is stored horizontally.

Figure 6:
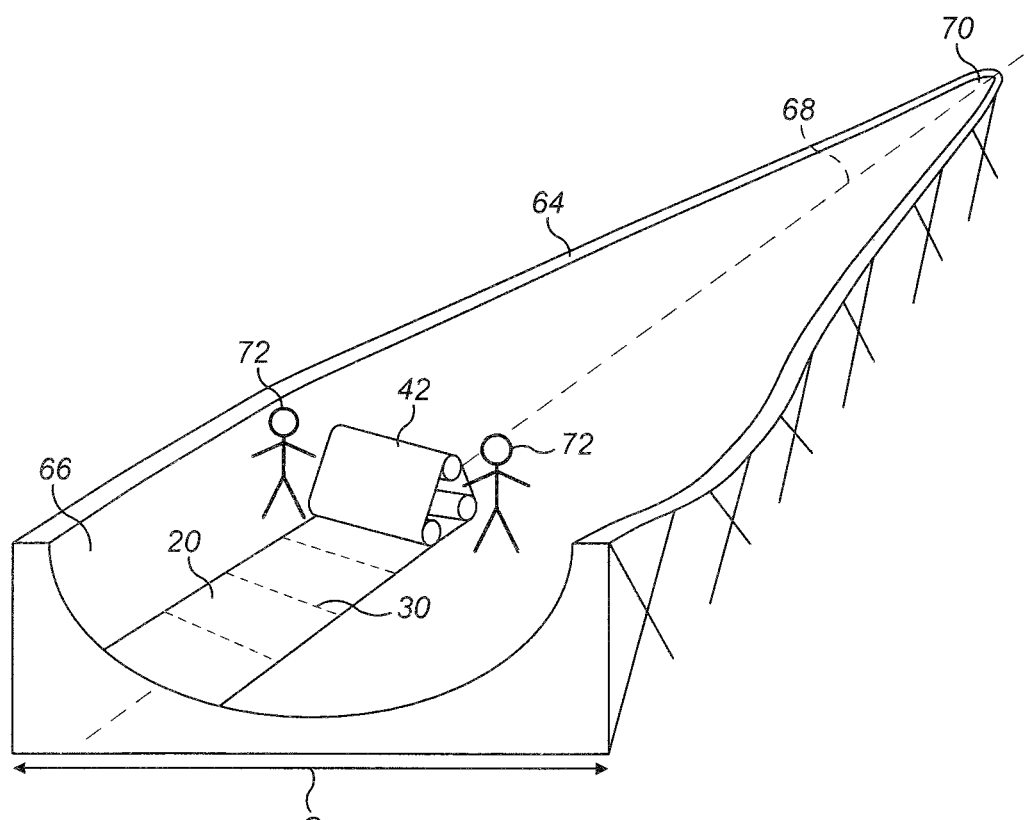
FIG. 6 shows a roll being unrolled along the surface of a wind turbine blade mould.
Figure 7:
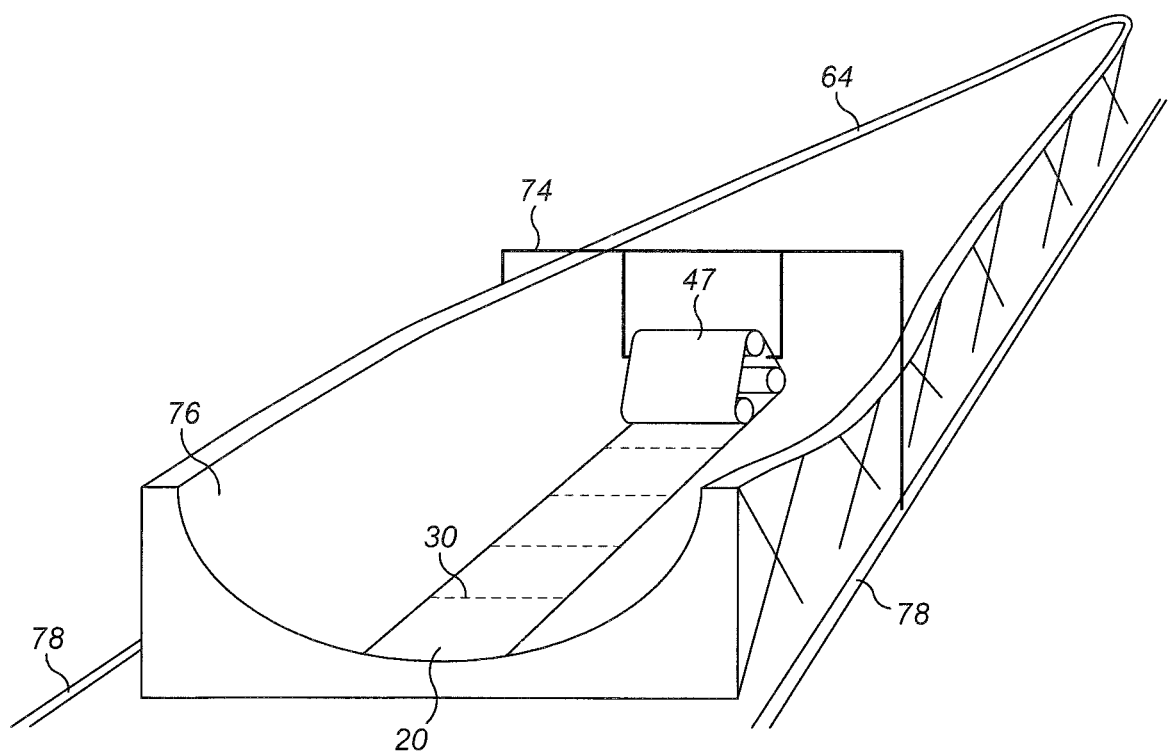
FIG. 7 shows a roll suspended from a gantry above a wind turbine blade mould and being unrolled into the mould.

Referring now to FIGS. 6 and 7 these show rolled stacks 20 being unrolled in a wind turbine blade mould 64. Referring first to FIG. 6, the roll 47 is initially lifted into the mould 64 and arranged, for example, at the root end 66 of the mould 64. Once in position, the roll 47 is unrolled in a longitudinal direction (as indicated by the dashed line 68) towards the tip end 70 of the mould 64. The stitch lines 30 holding the layers 26 of the stack together extend substantially in a chordwise direction C of the mould 64.

The process of unrolling the stack 20 can be performed simply and quickly by one or two operators 72. The novel configuration of the roll ensures that wrinkles are prevented in the stack 20 and hence the various layers 26 of the stack 20 are correctly aligned in the mould 64 and do not require significant adjustment. Referring now to FIG. 7, this shows an alternative method of unrolling the stack 20 in the mould 64. In this case the roll 47 is suspended from a gantry 74 above the surface 76 of the blade mould 64. The gantry 74 is configured to move longitudinally on a set of rails 78 provided alongside the blade mould 64.

Many modifications may be made to the above examples without departing from the scope of the present invention as defined in the accompanying claims. For example, the end plates 60 described in relation to FIG. 5 need not be circular, but could be any other suitable shape. Also, it will be appreciated that suitable end plates could be used in any of the examples instead of, or in addition to, the connecting members 36, 52 between supports 34, 50. Further embodiments are envisaged in which the reel includes more than three supports. For example, the reel may have four, five, six or more supports. The supports may be arranged in other suitable patterns, for example in a square or otherwise rectangular arrangement, or as a pentagon, hexagon etc.

The invention claimed is:

1. A roll of structural material having fibres for making a wind turbine blade comprising:
   a. an elongate stack comprising a plurality of layers of structural material stacked one on top of another and held together by fastening means and configured to be placed in a wind turbine blade mould; and
   b. a reel having a plurality of mutually spaced supports about which the stack is folded to form a rolled stack;
   wherein the reel is configured such that the rolled stack is supported by the supports and sections of the rolled stack between the supports are substantially unsupported by the reel and are thereby in a slack state;
   wherein the layers are fastened together along a plurality of fastening lines extending in a widthwise direction of the stack, the fastening lines being spaced at intervals in a longitudinal direction of the stack; and
   wherein the supports of the reel are mutually spaced apart by a distance greater than the intervals between fastening lines.

2. The roll of claim 1, wherein the reel comprises an inner region defined between the supports into which the unsupported sections of the rolled stack sag.

3. The roll of claim 1, wherein the supports are substantially elongate and extend in a direction substantially parallel to a widthwise direction of the stack.

4. The roll of claim 1, wherein the reel further comprises a pair of spaced-apart end plates and the supports are mounted between the end plates.

5. The roll of claim 4, wherein the end plates are substantially circular.

6. The roll of claim 1, wherein the supports are arranged in a substantially triangular configuration.

7. The roll of claim 1, wherein the supports are of substantially circular cross section.

8. The roll of claim 1, wherein the stack comprises a plurality of glass-fibre layers.

9. The roll of claim 1, wherein the layers are stitched together.

10. The roll of claim 1, wherein the stack is configured to form part of a wind turbine blade shell.

11. The roll of claim 1, wherein the reel further includes a planar connecting frame having first and second spaced-apart edges and wherein the reel has first and second supports operatively coupled to the first and second edges, respectively.

12. The roll of claim 1, wherein the reel further includes three planar connecting members arranged to form a triangle, and wherein the reel has three supports, each support being operatively couple to a respective vertex of the triangle.

13. A method of making a roll of structural material having fibres for making a wind turbine blade, the method comprising:
   a. stacking a plurality of layers of structural material one on top of another to form a stack;
   b. fastening the layers together along a plurality of fastening lines extending in a widthwise direction of the stack, the fastening lines being spaced at intervals in a longitudinal direction of the stack;
   c. providing a reel having a plurality of supports mutually spaced apart, wherein the supports of the reel are mutually spaced apart by a distance greater than the intervals between fastening lines; and
   d. folding the stack around the supports to form a rolled stack, wherein the rolled stack is supported by the supports and sections of the rolled stack between the supports are substantially unsupported by the reel and are thereby in a slack state, and wherein the stack is configured to be placed in a wind turbine blade mould.

14. The method of claim 13, wherein the reel further comprises an internal region defined between the supports, and the method further comprises allowing the unsupported sections of the rolled stack to sag into the internal region.

15. The method of claim 13, comprising assembling the stack on a substantially flat surface.

16. The method of claim 15, comprising rolling the stack around the reel on the substantially flat surface.

17. The method of claim 13, wherein step (b) comprises stitching the layers together.

18. The method of claim 13, comprising configuring the stack to form part of a wind turbine blade shell.

19. A method of making a wind turbine blade, the method comprising:
   a. providing a blade mould;
   b. providing a roll of structural material as claimed in claim 1, the structural material being configured to form part of a wind turbine blade shell; and
   c. unrolling the structural material into the mould.

20. The method of claim 19, further comprising making the roll outside the blade mould, transferring the roll to the blade mould and unrolling the structural material in the blade mould.

* * * * *